No. 771,699. PATENTED OCT. 4, 1904.
F. W. BLANCHARD.
MECHANICAL MOVEMENT.
APPLICATION FILED MAR. 11, 1903.
NO MODEL.
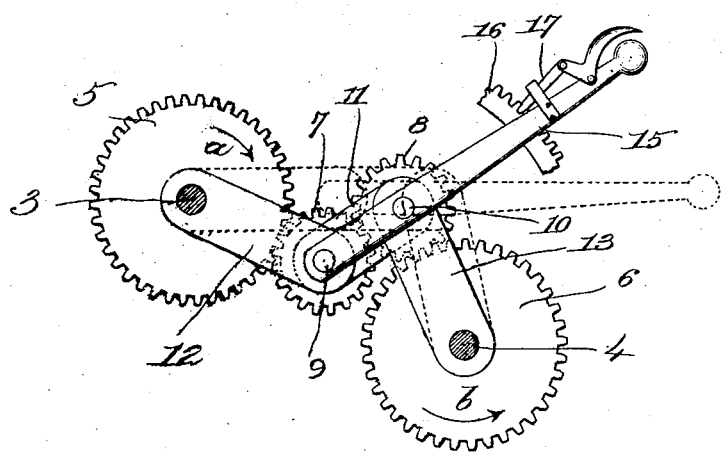

No. 771,699. Patented October 4, 1904.

UNITED STATES PATENT OFFICE.

FREDERIC W. BLANCHARD, OF HOLBROOK, MASSACHUSETTS.

MECHANICAL MOVEMENT.

SPECIFICATION forming part of Letters Patent No. 771,699, dated October 4, 1904.

Application filed March 11, 1903. Serial No. 147,231. (No model.)

*To all whom it may concern:*

Be it known that I, FREDERIC W. BLANCHARD, a citizen of the United States, residing at Holbrook, in the county of Norfolk and State of Massachusetts, have invented an Improvement in Mechanical Movements, of which the following description, in connection with the accompanying drawings, is a specification, like characters on the drawings representing like parts.

This invention relates to a mechanical movement which includes a driving member and a driven member; and the object of the invention is to provide a novel power-transmitting mechanism connecting said members for transmitting the rotation of the driving member to the driven member and which can be so operated, either while the driving member is stationary or while it is rotating, that one of the members can be adjusted angularly with reference to the other member.

The driving and driven members may be sprocket-wheels connected by chains, gears, shafts having gears or sprocket-wheels fast thereon, or any other suitable mechanical element. I have herein illustrated them as shafts having gears thereon.

The power-transmitting mechanism employed for connecting the driving and driven members is so constructed that it may be operated independently of one of said members either while the driving member is stationary or in motion, with the result that the other member is adjusted about its axis with respect to the first-named member.

The drawing shows one embodiment of my invention.

In the form of my invention herein illustrated the driving and driven elements are shafts which rotate about different axes, and 3 designates the driving and 4 the driven shaft.

5 designates a driving-gear fast upon the driving-shaft 3, and 6 designates a driven gear upon the driven shaft 4. Connecting these gears is a transmission mechanism adapted to transmit motion from the driving to the driven gear, such transmission mechanism comprising two gears 7 and 8, meshing with each other, one of which, 7, meshes with the driving-gear 5, and the other of which, 8, meshes with the driven gear 6. The spindles 9 and 10 of said gears 7 and 8 are journaled in a link 11, so that said gears are always in mesh. One end of said link is pivotally connected to an arm 12, which is loosely mounted upon the shaft 3, and the other end of said link is similarly pivoted to an arm 13, looosely mounted upon the shaft 4. With this construction the gear 7 can have a planetary movement about the gear 5 and the gear 8 a similar movement about the gear 6; but said gears 7 and 8 are always in mesh with each other.

The link 11 has fast thereto a suitable lever 15, by means of which it may be adjusted. Any suitable means may be employed for locking the lever in any adjusted position, and for convenience I have herein shown a rack 16, with which a latch 17, carried by the lever 15, coöperates.

Assuming that the shaft and gear 5 are rotated in the direction of the arrow $a$ and that the lever 15 is locked, it will be seen that the driven gear 6 will be rotated in the direction of the arrow $b$. If it is desired to adjust the driven gear or its shaft angularly with respect to the gear $a$ or its shaft, this may be accomplished by movement of the lever 15, for it will be observed that should the lever be swung into the dotted-line position the gear 7 will roll over the gear $a$ without affecting the movement of the latter; but such movement of the gear 7 being transmitted to the driven gear 6 through the gear 8 will give the gear 6 a forward movement with respect to the gear $a$. A movement of the lever 15 in the opposite direction will give the driven gear 6 a backward movement with respect to the driving-gear. By means of the rack 16 and latch 17 the lever 15 may be locked in its adjusted position and the advance or backward movement given to the driven element with respect to the driving element maintained.

While I have described the gear 5 as a "driving-gear," it will be obvious that the mechanism would work equally well if 6 were the driving-gear. While I have herein shown the driving and driven members as being shafts 3 and 4, it will be obvious that the gears 5 and 6 might be regarded as the driving and driven elements.

A mechanical movement such as above described may be used in any construction where two shafts or members are employed, one of which is driven from the other, and where it is desired for certain purposes to advance or retract one shaft angularly with respect to the other.

While I have herein shown one way in which my invention may be embodied, I do not desire to be limited to the construction shown, as it will be obvious that many changes in the arrangement of the gears may be employed without departing from the invention expressed in the appended claims.

Having described my invention, what I claim, and desire to secure by Letters Patent, is—

1. In a mechanical movement, two gears rotatable about different axes, an arm mounted to swing about the axis of each gear, a link connecting the free ends of said arms, and two intermeshing, intermediate gears, one of said intermediate gears being carried by each arm and meshing with the corresponding main gear.

2. In a mechanical movement, two shafts, a main gear fast on each shaft, a swinging arm or support carried by each shaft, a link connecting the free ends of said arms, and a plurality of intermediate gears meshing with each other, one of said gears being carried by each swinging arm and meshing with the corresponding main gear.

3. In a mechanical movement, two gears rotatable about different axes, an arm mounted to swing about the axis of each gear, a link connecting the free ends of said arms, two intermeshing, intermediate gears, one of said intermediate gears being carried by each arm and meshing with the corresponding main gear, and means to adjust the intermediate gears with reference to either of the main gears.

4. In a mechanical movement, two main gears, an arm or support mounted to swing about the axis of each gear, an intermediate gear carried by each arm and meshing with the corresponding main gear, and means to hold the intermediate gears in mesh with each other.

5. In a mechanical movement, two main gears, an arm or support mounted to swing about the axis of each gear, an intermediate gear carried by each arm and meshing with the corresponding main gear, means to hold the intermediate gears in mesh with each other, and means to adjust the intermediate gears with reference to either of the main gears.

In testimony whereof I have signed my name to this specification in the presence of two subscribing witnesses.

FREDERIC W. BLANCHARD.

Witnesses:
JOHN C. EDWARDS,
LOUIS C. SMITH.